Feb. 5, 1935.   V. G. APPLE ET AL   1,990,448
BRAKE CONTROL
Original Filed Jan. 16, 1930
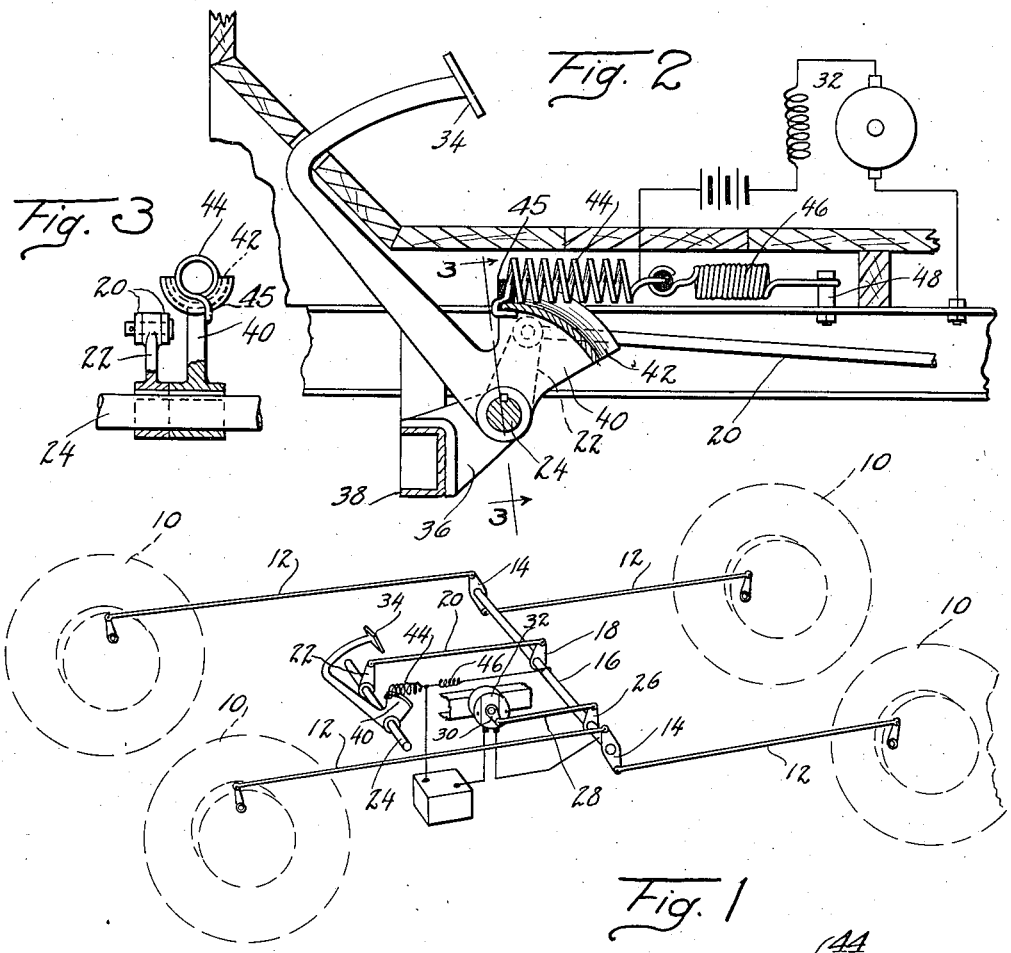
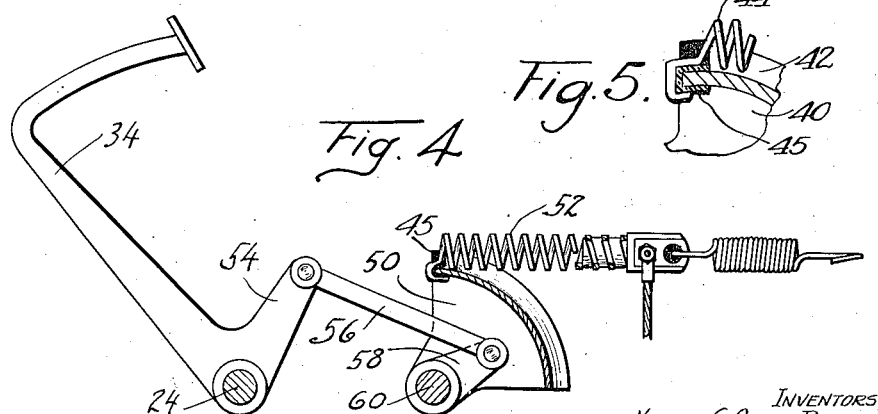
INVENTORS
VINCENT G. APPLE, DECEASED.
HERBERT F. APPLE EDWARD M. APPLE
and GOURLEY DARROCH, EXECUTORS.
CARL F. RAUEN.
ATTORNEYS Patented Feb. 5, 1935

1,990,448

UNITED STATES PATENT OFFICE 1,990,448

BRAKE CONTROL

Vincent G. Apple, deceased, late of Dayton, Ohio, by Herbert F. Apple, Edward M. Apple, and Gourley Darroch, executors, Dayton, Ohio, and Carl F. Rauen, Dayton, Ohio, assignors to Bendix Brake Company, South Bend, Ind., a corporation of Illinois Original application January 16, 1930, Serial No. 421,329. Divided and this application March 17, 1933, Serial No. 661,372

28 Claims. (Cl. 188—156)

This invention relates to a rheostat, or variable resistor element, and has particular reference to one designed for use in conjunction with a system of electric brakes. This is a division of co-pending application, Serial No, 421,329, filed January 16, 1930.

An object of this invention is to simplify the control means for varying the current strength of an electric brake circuit. Where electric power is utilized to apply automotive vehicle brakes it is quite customary to include in the circuit a variable resistor wherein the resistance is decreased as greater effort is applied to the brake pedal. Resistor elements have usually comprised a relatively large, bulky unit which occupied considerable space and which rendered the control mechanism in its entirety quite expensive.

In obtaining the above specified object use has been made of the brake pedal and its customary retraction spring in such a cooperative manner that they may be used without additional mechanism as a variable resistance in the electric brake circuit. The use of the retraction spring performing with the brake pedal its dual function of a return spring and a resistor element in an electric circuit produces an extremely efficient and inexpensive device.

Other meritorious features of this invention will become apparent from the following description taken in conjunction with the following drawing wherein like numerals refer to like parts and wherein:

Figure 1 is a diagrammatic sketch of a resistor unit as placed in circuit with a system of electric brakes, Figure 2 is a sectional elevation of the brake pedal stem and resistor element, including diagrammatically an electric circuit for operating the brakes, Figure 3 is a sectional elevation along the line 3—3 of Figure 2, and Figure 4 is a sectional elevation of a somewhat modified form of a resistor element.

Figure 5 is a fragmentary enlargement of the connection between the resistor element and a segment.

In the diagrammatic sketch (Figure 1) the brake shoes on each of the four wheels 10 are connected up in any well known fashion by the rods 12 to the arms 14 of the rotatable brake shaft 16. A third arm 18 is secured to the shaft 16 and is connected through the link 20 to an arm 22 secured to the brake pedal shaft 24. A fourth arm 26 is secured to the shaft 16 and this is connected up through the link 28 with an arm 30 fastened to the armature shaft of an electric motor 32. This electric motor is secured to the frame of the chassis in any convenient manner. It is obvious that upon rotation of the electric motor when the circuit therethrough is closed, the arm will be rotated and, through the linkage hereof described, will assist in applying power to the brakes.

The brake pedal 34 is splined to the shaft 24, which shaft is journalled in a bracket 36 which is secured to the cross frame 38 of the vehicle. The base extremity of the brake pedal stem is provided with an angularly extending segmental section 40, the periphery of which is grooved as at 42 to provide a seat for the coil spring 44.

This coil spring 44 is composed of resistance wire and one extremity thereof is insulatively secured to one edge of the groove 42, as indicated in Figures 2, 3 and 5. An insulative pad 45 secured about the edge of the groove 42 prevents electrical connection between the spring and the groove when the parts are in normal inoperative position. The spring extends away in tangential relation to the periphery of segment 40 and at its other extremity is secured by means of an insulated connection to a second coil spring 46. The other extremity of this second coil spring is secured to some fixed member on the chassis as by the stud 48. It will be apparent that the rear end of the resistance coil 44 itself may be secured through insulation to any fixed point such as the aforesaid stud 46.

Electric connections extend, as clearly illustrated in Figures 1 and 2, from one extremity of the coil spring 44 to the storage battery and from the storage battery on through electric motor 32, from which it is grounded on some convenient portion of the chassis. The circuit is shorted from whatever portion of spring 44 contacts the peripheral groove as a seat. From there the circuit leads through the segment 40 and is then grounded through the bracket 36 and chassis frame 38.

It will be obvious from a brief survey of the drawing that as the brake pedal 34 is depressed, an increasingly large portion of the spring 44, which constitutes a resistance element, will be shortcircuited, and that conversely, a decreasing resistance will be included in the circuit through the electric motor 32 which functions to apply the brakes.

In Figure 4 the construction illustrated in Figures 1 and 2 has been modified somewhat in that a segmental member 50 which provides a seat for the resistance coil 52 is pivoted about a shaft spaced from that on which the brake pedal 34 is mounted. The connection of the spring 52 with the segment 50 is insulated at 45 in the same manner as that described in connection with Figures 1 through 4. An arm 54 on the base extremity of the brake pedal is connected by the link 56 to an arm 58 which is secured to the shaft 60, upon which latter shaft the segment 50 is secured. In this way is provided a somewhat stepped up movement of the segment 50 with relation to the arm 54 of the brake pedal. By virtue of the difference in length in the arms 54 and 58 the latter arm will travel through a greater arc than the former during any predetermined movement of the brake pedal 34 and thus decrease the resistance in the brake circuit more rapidly than in the modification disclosed in the other figures.

It is to be noted that the resistance element may serve the dual function of varying the resistance in circuit while serving as a retraction spring for the brake pedal.

Various modifications of this device will become apparent to those skilled in the art and for that reason this invention is limited only within the scope of the appended claims.

What is claimed, is:

1. Vehicle brake mechanism comprising, in combination, brakes, electric control means to actuate the brakes, a brake pedal, means to vary the braking effort of said electric control means in proportion to the pedal movement comprising a resistance coil in the circuit and a member swingable with the pedal to progressively engage said coil.

2. Vehicle brake mechanism comprising, in combination, brakes, power means to apply the brakes, a brake pedal, electric control mechanism to vary the effort of said power means as a function of the pedal movement comprising an electric resistance coil and a pivoting member having a grooved face swingable in response to pedal movement to bring said grooved face into engagement with the coil.

3. In combination with brake mechanism and electric applying means coupled therewith, a manually operable control member including a segmental member swingable about a fixed point upon actuation thereof, an electric circuit including the brake applying means, and a resistance coil in said circuit having one end secured to said segmental member to wrap around its periphery upon swinging movement thereof and the other end secured to a fixed insulated member whereby the resistance in said circuit is decreased upon continued movement of said control member against the pull of the resistance coil.

4. Brake mechanism including brakes, electric actuating means therefor, a manually operable control member, and a resistance coil in the electric brake circuit secured to and insulated from a fixed element at one end and to the control member at the other end, said resistance coil being adapted to cooperate with a portion of the control member to progressively decrease its resistance as it is stretched by movement of the control member.

5. In a vehicle brake mechanism comprising, in combination, brakes, a manually operable control member therefor, a retraction spring to hold said manual member yieldingly in the idle position, an electrical circuit including power means to apply the brakes, and a variable resistance in said circuit constituting said retraction spring.

6. Brake mechanism including brakes, electrical actuating means therefor including an electric circuit, an operable control member, and a resistance in the circuit for the electrical actuating means connected at one end to the control member and secured at its opposite end to progressively resist the movement of the control member, said resistance being adapted to cooperate with a portion of the control member to progressively decrease its resistance during movement of the control member.

7. In a brake mechanism, brakes, a brake control member including a portion swingable about a fixed point upon actuation thereof, yieldable means secured to said swingable portion of the brake control member and adapted to wrap around said portion upon swinging movement thereof, said yieldable means cooperating with said portion of the control member to form a variable electrical resistance during movement of said portion.

8. In a brake mechanism, brakes, a brake control member, an arcuate member adapted to be oscillated about an axis by said control member, a spring secured at one end to the arcuate member and adapted to wrap around the arcuate member upon oscillation thereof, an electric circuit including said spring and arcuate member the current through which is varied by the wrapping of said spring upon oscillation of the arcuate member.

9. In a brake mechanism, brakes, a brake control member, an electric power means to apply the brakes including an electric circuit, and a resistance in said circuit adapted to wrap around a portion of the control member upon actuation thereof, said wrapping action varying the resistance in said circuit.

10. Brake mechanism comprising, in combination, brakes, an electric motor for applying said brakes, a circuit for said motor, a resistance in said circuit, manual control means connected to a movable member, said movable member forming an electrical connection with said resistance and adapted upon movement to progressively engage greater surfaces of said resistance and thereby vary the resistance in the motor circuit.

11. Brake mechanism comprising, in combination, brakes, electric power means for applying said brakes, manual control means, a movable member adapted to be moved by said control means, an electric circuit for said power means having a resistance electrically connected with said movable member, said movable member upon actuation of the control means adapted to engage a larger surface of said resistance whereby the resistance in said power circuit is varied.

12. In a brake mechanism, brakes, a brake operating lever, a series of springs resisting the movement of said lever, an electric circuit including the lever and one of the springs, said lever upon movement thereof adapted to progressively engage said spring and thereby vary the resistance in said electric circuit.

13. A brake pedal retraction spring constituting a variable electrical resistance in an electric circuit.

14. In a vehicle brake mechanism, a brake pedal, and a return spring for said pedal, said spring in conjunction with said brake pedal forming a variable resistance in an electrical circuit.

15. In a vehicle brake mechanism, a brake actuator, resilient means to yieldingly hold said brake actuator in one position, said resilient means cooperating with said brake actuator to form a variable resistance in an electrical circuit.

16. In a vehicle brake mechanism, electrical power means to apply the brakes, a manual control member, and resilient means to yieldingly hold said manual control member in one position, said resilient means cooperating with said manual control member to vary the electrical power means.

17. In a brake mechanism, a brake control member, a retraction spring for said member, an electric circuit including said retraction spring, and means on said control member cooperating with said retraction spring to vary the flow of current through said circuit.

18. In a vehicle, brakes for said vehicle, a control member for said brakes, an electric circuit in said vehicle, and a retraction spring for said control member, said spring constituting a resistance in said electrical circuit and adapted upon movement of said member to cooperate with an element to vary its resistance.

19. Brake mechanism including brakes, electrical power means to apply the brakes including an electric circuit, an operable brake control means provided with a retraction device, and a resistance in said circuit including a part of said retraction device.

20. Vehicle brake mechanism comprising, in combination, brakes, a manually operable brake control member, linkage connecting said member with the brakes for applying the latter, a power device for assisting the manual application of said brakes, a variable controller for said power device forming a retraction mechanism normally retaining said control member in inoperative position and yieldably resisting movement of said control member therefrom, said variable controller adapted to vary the brake applying effort of said power mechanism upon movement of said manual control member.

21. Brake mechanism comprising, in combination, brakes, power means for applying the brakes, a manually operable member, and a yieldable device for retracting said member to one position of its movement, said retracting device yieldable to movement of said member and cooperable therewith to form a variable controller for said power means to regulate the brake applying effort thereof.

22. Brake mechanism comprising, in combination, brakes, a brake operating member, linkage leading therefrom to the brakes, a power device to assist said brake operating member, and a variable controller for said power device forming a tensioning mechanism yieldingly retaining said member in inoperative position and adapted upon brake applying movement of said member to increase the force exerted by said power device in proportion as the tension in the mechanism is increased.

23. In a brake mechanism, a brake, power means for applying the brake, a manually operable member, mechanism yieldingly maintaining said member in one position of its movement, said mechanism forming a variable controller for said power means and adaptable upon movement of said member to vary the brake application of said power means.

24. Vehicle brake mechanism comprising, in combination, brakes, power means for applying the brakes, manual means for applying the brakes including a manual operable member, and a variable controller for said power means forming a tensioning mechanism yieldingly retaining said manual operable member in inoperative position and adapted upon brake applying movement of the member to increase the force exerted by said power means in proportion as the tension of the mechanism is increased, said tensioning mechanism coupled with said member through a power multiplying connection so that the mechanism is tensioned at a proportionally greater rate than the brake applying movement of the member.

25. Vehicle brake mechanism comprising, in combination, brakes, power means for applying the brakes, a manual control member, a variable controller for said power means forming a tensioning mechanism yieldingly restraining said member in one position of its movement and adapted upon movement of said member to vary the brake application of the power means, said mechanism connected to said member through a power varying leverage so as to cause said mechanism to tension at a different rate than the rate of movement of the member.

26. A brake pedal retraction spring constituting a variable electric controller in an electric circuit, the coupling of said spring to said member being such that the spring is tensioned at a rate differing from that of the brake applying movement of the pedal.

27. In a vehicle, a source of electric power, an electric power consuming device, a pedal, a retraction spring for said pedal, said spring forming a variable electric controller for varying the delivery of the electric power from said power source to said device.

28. In a motor vehicle a source of electric power an electric power consuming device, a manually operable member, a retraction spring for said member tensioned so as to yieldingly restrain the member in inoperative position, said spring forming a variable controller for said power device and adapted to vary the delivery of power from said source to said device in proportion to the tensioning of said spring.

EDWARD M. APPLE,
HERBERT F. APPLE,
GOURLEY DARROCH,
*Executors of Vincent G. Apple, Deceased.*
CARL F. RAUEN.